Dec. 15, 1936.　　M. R. FENSKE ET AL　　2,064,422
PROCESS AND APPARATUS FOR TREATING MINERAL OILS
Filed Nov. 9, 1933　　2 Sheets-Sheet 1
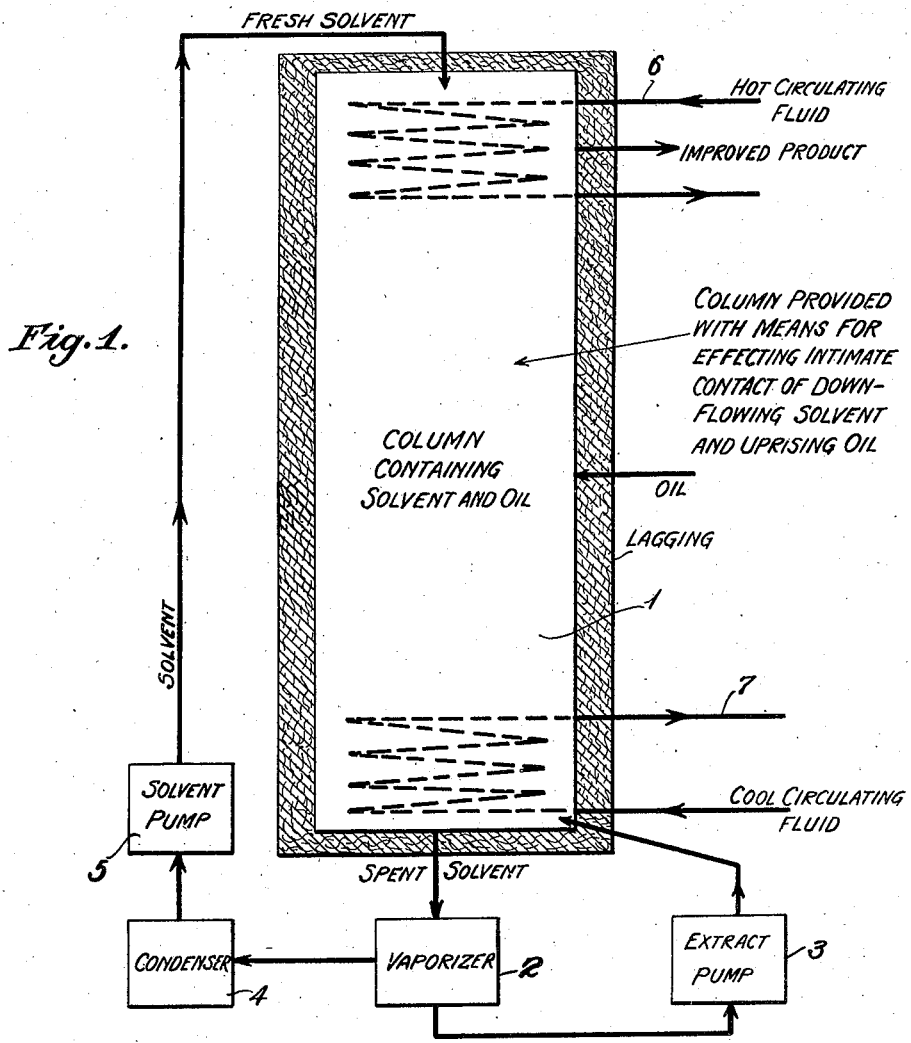
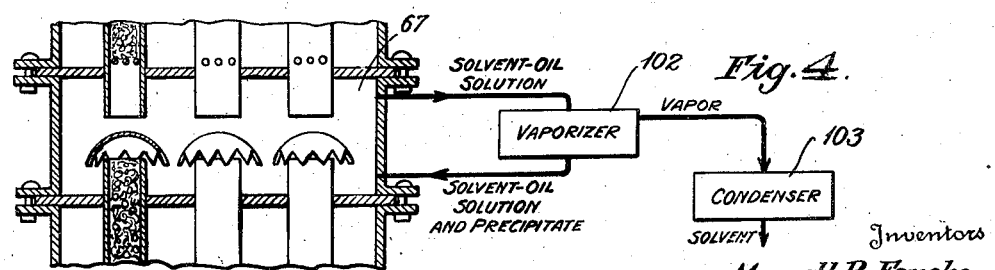
Inventors
Merrell R. Fenske
and Wilbert B. McCluer
By Hugo A. Kernman
Attorney Dec. 15, 1936. M. R. FENSKE ET AL 2,064,422
PROCESS AND APPARATUS FOR TREATING MINERAL OILS
Filed Nov. 9, 1933 2 Sheets-Sheet 2
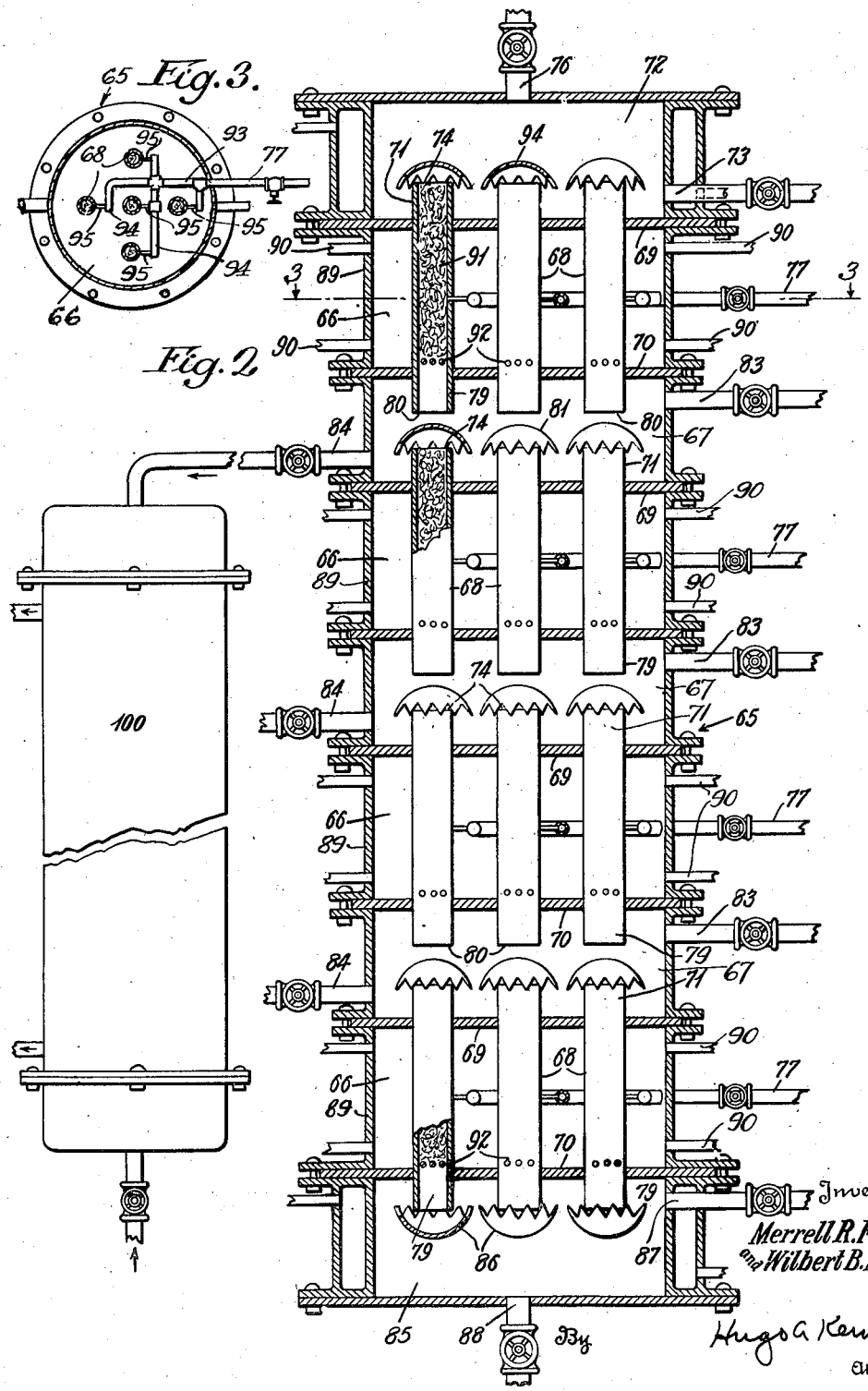
Inventors
Merrell R. Fenske
and Wilbert B. McCluer
Hugo A. Kemmen
Attorney Patented Dec. 15, 1936

2,064,422

UNITED STATES PATENT OFFICE 2,064,422

PROCESS AND APPARATUS FOR TREATING MINERAL OILS

Merrell R. Fenske and Wilbert B. McCluer, State College, Pa., assignors to Pennsylvania Petroleum Research Corporation, a corporation of Pennsylvania

REISSUED

SEP 10 1940

Application November 9, 1933, Serial No. 697,344

12 Claims. (Cl. 196—13)

This invention pertains to the separation of mixtures of materials. It will be described in connection with the extraction and/or fractionation of mineral oils by the use of solvents. However, it is to be understood that it is applicable to the separation of mixtures in general.

In copending application Serial No. 10,932, filed March 13, 1935, by Merrell R. Fenske and Wilbert B. McCluer, which has matured into Patent 2,037,318, April 14, 1936, is described a process and apparatus adapted for the extraction and/or fractionation of mineral oils wherein a plurality of liquids of different densities are flowed relatively to each other by virtue of differences in their densities. The types of apparatus described in said copending application employ columns wherein at least one liquid phase is maintained in a widely distributed form by causing said relative movement between said phases to take place in the presence of a group of attenuated packing members arranged in the zone of contact side by side and longitudinally of the flow of at least one phase. In practicing said invention with countercurrent flow, the liquids enter the column at vertically spaced points, the feeding points of said liquids being generally arranged in the order of their densities with the heaviest liquid being fed at the top, although this is not absolutely essential. At least one light solution of the liquids is usually taken off from the column at the top thereof and at least one heavy solution of the liquids is usually taken off from the column at the bottom thereof.

In a more specific form of said invention, one or more of the counter-currently flowing liquids is maintained in a plurality of separate streams, highly efficient contact means are provided and/or special means is provided for the prevention of channeling of the counter-currently flowing liquids with or without the setting up of reflex conditions.

The invention herein also pertains to a process wherein a mixture is separated into desired portions by flowing said mixture through a column relatively to a solvent, the term solvent being employed in a broad sense to include a mixture of compounds and regardless of the effect upon the materials to be separated. In this invention special provision may also be made for rectifying or scrubbing the phases while in the column. Provision may be also made in certain instances for taking off a side stream or side streams of any or all of the separated portions.

Reflux conditions may be set up by reducing the solvent power of the solvent as it flows through the column. Reduction in solvent power may be accomplished either by lowering the temperature or by the addition of a second solvent which acts as a precipitant, or by means of removing the solvent for instance by vaporization. If reduction in solvent power is accomplished by lowering the temperature, the temperature change may be gradual throughout the length of the column or it may be caused to change abruptly at one or more points in the column. The temperature may be reduced in the direction of solvent flow to cause reflux of oil or in the direction of oil flow to cause reflux of solvent although the former is desired. If reduction in solvent power is accomplished by the addition of a second solvent which acts as a precipitant, this second solvent may be added at one point or at a multiplicity of points throughout the length of the column. The addition of the second solvent at a multiplicity of points throughout the length of the column corresponding to successive increases in the concentration of the second solvent in the solvent phase in the direction of solvent flow is particularly effective. Reduction in solvent power of any solvent within a column results in continual precipitation of dissolved oil and continual solution of undissolved oil which produces a condition analogous to reflux as occurring in distillation that is highly desirable.

The invention herein pertains more particularly to the alternate engagement and disengagement of phases in a continuous system to obtain the advantages not only of ordinary continuous countercurrent contact but also the advantages of batch contact and particularly batch countercurrent contact.

Further features of the invention reside in the construction, arrangement and combinations of parts and in the steps, sequences, and combinations of steps, all of which together with further features will become more apparent to persons skilled in the art as the specification proceeds and upon reference to the drawings in which like reference characters have been appended to like parts in the various figures, and in which Figure 1 is a flow sheet illustrating the reflux action, Figure 2 is a sectional elevation of a further form of the invention, Figure 3 is a section on line 6a—6a of Figure 2, and Figure 4 is a sectional elevation shown broken and partly in flow sheet form.

The benefits derived from reflux may be evidenced as follows: Figure 1 is a schematic sketch showing a contacting column 1, a vaporizer 2, an extract pump 3, a condenser 4, a solvent pump 5, a hot circulating medium 6, and a cool circulating medium 7. This figure represents a specific case in which the solvent is heavier than the oil. If, for simplicity, the specific case is assumed in which the column is charged with a single appropriate quantity of oil and filled with solvent which is circulated continually by the arrangement of apparatus as shown in which no products are removed from the system, a condition of total reflux prevails. That is to say, warm fresh solvent continually dissolves oil at the top of the column and reaches a saturation value; the oil which is dissolved is that of poorer (or better) lubricating value as defined by viscosity index if the solvent is selective as to type of molecule; this dissolved oil is carried along by the solvent on its downward path through the column: since the column is shown as being lagged and hence under adiabatic conditions except for the top and bottom where heat is added and withdrawn respectively, the solvent becomes progressively cooler on its downward path through the column and accordingly progressively supersaturated with respect to the amount of oil initially dissolved and oil is thrown out of solution or precipitated continually during the downward course of the solvent; this oil which is precipitated is of progressively lower quality as more and more oil is precipitated; and this condition produces a quality gradient in the precipitated oil throughout the length of the column; as soon as the small droplets of oil are precipitated they start to rise through the solvent medium in the column since they are lighter than the solvent; lower quality oil in the undissolved state tends to displace higher quality oil in the dissolved state; hence, during the time interval that the precipitated oil is rising through the column, the lower quality materials are dissolved by the solvent and higher quality materials are precipitated which in turn start to rise through the column and are dissolved and precipitate still higher quality materials, etc.; the stipulations that no materials are removed from the system and that fresh solvent is continually fed in at the top of the column are fulfilled by vaporizing pure solvent from the spent solvent containing dissolved oil and returning the fresh solvent to the top of the column and recirculating the extract into the lower portion of the column; under these prescribed conditions a steady state exists within the column and a quality gradient of oil is set up and maintained within the column.

It is evident that in the case in which the oil is heavier than the solvent that the system need only be reversed in order to carry out a similar effect. It is also evident that a similar condition can be effected if the solvent powers of the solvent are decreased by the addition of a precipitant as previously mentioned. Under any practical operating condition, it is necessary to remove product either intermittently or continuously. The process described above is operable under either condition although the latter is preferred. In continuous operation, fresh oil is fed into the column at some one point or at a multiplicity of points although it is preferred to feed the oil into a section of the column where the naturally established quality gradient is equal to that of the quality of the feed. In this manner, the equilibrium conditions prevailing in the column are disturbed to the least degree. Improved product is removed continuously from the top of the column while segregated product is removed from the vaporizer. A portion of this latter material may or may not be returned to the lower part of the column depending chiefly upon the temperature differential employed between the top and bottom of the column and the solubility of the oil in the solvent employed.

For comparative purposes only, the effect of reflux on increasing the efficiency of any given column in separating lower and higher quality materials from a given quality of feed may be likened to processing, reprocessing, and reprocessing the original material in columns where reflux is not employed.

The same method of operation and principles apply when the extraction is used to fractionate an oil to produce materials of varying viscosity characteristics instead of varying quality characteristics.

Referring now to Figures 2 and 3, at 65 is shown a column adapted for the alternate engagement and disengagement of phases. It will be noted that column 65 is provided with means for taking off side streams either of oil or of solvent, or of both. Column 65 as shown comprises a plurality of superimposed sections 66, with each adjacent pair of sections 66 being joined by an interposed segregating chamber 67. Any means may be provided for joining the sections 66 and chambers 67 together, such as the flange construction illustrated.

Each section 66 as shown comprises a plurality of tubes 68 which are supported in and project through a pair of spaced plates or headers 69 and 70.

The upwardly projecting ends 71 of the tubes 68 of the upper section 66 project into feeding and segregating chamber 72, the plate 69 of this section forming the bottom of said chamber 72. The inlet 73 for the heavier liquid is preferably below the upper edges 74 of the ends 71 of tubes 68, and edges 74 are preferably in a horizontal plane so as to act as weirs for uniformly feeding the heavy liquid into each of the tubes 68 of the upper section 66.

An outlet 76 is shown for chamber 72 for the withdrawal of light solution.

The tubes 68 of each of the sections 66 are illustrated as being provided with feeding means 77.

The feeding means 77 may be of any desired construction. That shown is more particularly illustrated in Figure 3 as comprising a main feeder tube 93 having a plurality of branches 94, each branch communicating with the interior of a tube 68. The flow is illustrated as being controlled by metering orifices 95 comprising small tubes of equal length and diameter. The purpose of adjusting flow is to introduce the desired amount of liquid into each of the tubes 68 for the preferred conditions of operation.

The upper ends 71 of each of the tubes 68 of the lower and of the intermediate sections 66 project up into a segregating chamber 67, and the lower projecting ends 79 of each of the tubes 68 of the upper and intermediate sections 66 project downwardly into a segregating chamber 67.

The upper edges 74 of the ends 71 of tubes 68 in any chamber 67 are also preferably in the same horizontal plane. The lower edges 80 of the lower ends 79 of each of the tubes 68 of any section 66 are also preferably in a horizontal plane.

When the tubes 68 of any two or more sections are vertically aligned or vertically overlapped, a cap 81 is preferably interposed between any two aligned or overlapping tubes 68 to prevent direct flow of liquid from one tube 68 to the next.

Cap 81 may be of the order of a bubble cap employed in bubble cap towers, if desired, particularly if the bubble cap contacting effect is desired. Cap 81 if of the bubble cap type should be so positioned with respect to the end 71 as not to cause the liquids to lock. This may require bringing the bottoms of the saw teeth above the plane of the edges 74. However, any other type of cap 81 or other means may be provided for the purposes above set forth.

Each chamber 67 as shown communicates with a pipe 83 preferably above the plane of the edges 80 and with a pipe 84 preferably below the plane of the edges 74 for purposes which will hereinafter appear. The ends 79 of the lower section 66 project downwardly into feeding and segregating chamber 85 and each end 79 may be provided with an inverted cap 86 if desired. Any of the other ends 79 may also be provided with inverted caps 86, if desired, for instance, to increase the number of bubble cap contacts.

Chamber 85 is provided with an inlet 87 for the lighter liquid and an outlet 88 for the heavier solution.

Each of the sections 66 is provided with a shell 89 which is joined to the flanges of the particular section. Each shell 89 is provided with openings 90 for the ingress and egress of a heat exchange fluid.

Each of the tubes 68 is illustrated as being packed with a packing 91 which may be of any desired type. Jack chain for instance is found to be very suitable, although any other type of packing may be employed.

Certain types of packing comprise carding teeth, single turn, double turn, triple turn, or polyturn helixes, open rings, bent carding teeth, H shaped, S shaped, double crossed (#) shaped wire forms, all having dimensions more or less comparable to carding teeth used in the textile industry.

The packing may be supported in each tube 68 by any suitable means, such as that illustrated at 92.

However when tubes 68 are of small inner diameter, packing materials may not be required.

Tubes 68 may, of course, have a cross section of any desired geometrical configuration but are preferably of sufficiently small cross sectional area to avoid serious channeling of the phases through each other. The preferred limiting cross sectional area for each tube 68 will be not only a function of the type of contacting means (if any), but also of the manner in which the contacting means is arranged in each tube, for instance of the degree of uniformity of distribution of packing. Since the tubes may have sides which are straight or indented or of other surface configuration, the departure of a tube from a straight or continuous form will have its influence. For this reason a definite limit in cross sectional area which, if exceeded in size, will no longer demonstrate the substantial increase in efficiency which we have discovered results from a constriction of cross sectional area, cannot be given, but may be readily determined, for instance by testing the efficiency of single tubes of different size after any contacting means to be employed is arranged therein.

It may be stated as a general rule that one should proceed with caution after exceeding a cross sectional area equivalent to that of a circular tube in the neighborhood of two or three inches in diameter although with a proper selection of packing or other contacting means and a careful distribution in each tube, it may be possible that larger cross sectional areas may be employed while in other cases smaller cross sectional areas may be required.

Therefore, the term "relatively small cross sectional area" or its equivalent, when employed in this specification and in the claims, is intended to mean a cross section which is sufficiently small to materially increase the contacting efficiency because of the constriction of its area.

We have obtained highly efficient phase contact without serious channeling in tubes of various cross sectional areas, for instance tubes of circular cross section and of 3/4 inch, 1 inch, and of 1.75 inches in diameter.

It is simpler to have tubes 68 of any one set of substantially the same cross sectional area and packed in a manner to have substantially the same pressure drop. Thus each phase will substantially equally divide between the tubes. Since the result of this is to maintain substantially the same proportion of solvent phase to oil phase in each tube of the set, it will be obvious that the tubes 68 of the set may be of different sizes and that the feeding rates may vary according to the difference in perimeters of the tubes and/or adjustments of pressure drop, particularly if substantially the same proportion of phases is maintained in each tube. In other words, the result of having tubes 68 of the same size and of maintaining uniform feeding conditions for each tube is to cause the raffinate phase produced by each tube to be substantially of the same composition as the raffinate phase produced by any other tube; and to cause the extract phase produced by each tube to be of substantially the same composition as the extract phase produced by any other tube. From this it will be obvious that if tubes 68 should vary in size the feeding rates should be adjusted to obtain similar conditions.

The tubes 68 in any set may be of any desired number and may be of any desired length. In choosing such length, consideration will, of course, be given to the number of theoretically perfect batch contacts desired in the particular tubes whether such number be an integer or a fraction.

The column may be operated at any desired pressure. This pressure may be atmospheric, particularly if the solvents are liquid at atmospheric pressure, or elevated, particularly if this is necessary to maintain one or more of the solvents in the liquid phase (partially or wholly as desired) while in the column; or reduced, should this be desirable for any reason, for instance to bring a part of the solvent or solvents into the vapor phase.

In describing the operation of the column 65, it will be assumed that the oil is heavier than the solvent. Oil may be fed in through the opening 73 and if so it will rise about the ends 71 of tubes 68 of the upper section 66 and if the edges 74 are in the same horizontal plane, the oil will overflow equally into each tube 68 of the upper section 66.

The undissolved oil flows downwardly into the uppermost chamber 67 and collects therein about the ends 71 of the tubes 68 of the next lower section 66. If the upper edges 74 of the ends 71 of the tubes 68 of the latter section 66 are in a horizontal plane, the oil will be fed uniformly into the tubes 68 of the latter section 66 and the undissolved part will flow therefrom down into the next lower chamber 67 wherein as in each succeeding section 67 the process of oil collection and redistribution is repeated.

That portion of the oil (if any) which is not dissolved eventually reaches chamber 85 wherein it segregates from the inflowing fresh solvent and is withdrawn at 88.

Fresh solvent will be fed in through 87 and uniformly up through the tubes 68 of the lower section 66 because of its uniform head at the lower ends of these tubes 68. Caps 86 may be provided over the ends 79 should the bubble cap contact be desired. Otherwise the caps may be removed and, if desired, ends 79 of lower section 66 may be made flush with the plate 70 thereof.

The solvent upon reaching the lowermost chamber 67 separates from the down-flowing oil and forms a layer about the downwardly projecting ends 79 of the tubes 68 of the next higher section 66. Since the edges 80 of the ends 79 are in a horizontal plane, the up-flowing solvent will be equally distributed among the tubes 68 of the latter section 66. Such equal distribution would also take place if the lower edges 80 were flush with the plate 70 of the respective section.

The solvent continues up through the tubes 68 of this section 66 and is redistributed in a like manner in each of the succeeding higher chambers 67.

A counter-current flow of oil and solvent is thus brought about with the addition of disengagement of phases and redistribution intermediate the ends of the column.

This alternate engagement and disengagement of phases combines in one continuous system the advantages of ordinary continuous countercurrent contact and the advantages of batch contact and particularly batch countercurrent contact.

The redistribution means provided in each of the chambers 67 permits the taking off of side streams of oil through the openings 84 and/or side streams of solvent through the openings 83.

This construction also makes it possible to feed in oil through any of the openings 84 and to feed in solvent through any of the openings 83. A third liquid such as an oil precipitating liquid previously referred to might also be fed in at any of the openings 83 or at any of the openings 84 instead of through the means 77 more specifically provided for that purpose.

If the process is one of solvent extraction, the side streams of oil will have increasing degrees of improvement from the top to the bottom of the column and the highest degree of improvement will be obtained in the oil withdrawn at 88.

From the foregoing it will be seen that this form of the invention may be operated with or without producing reflux.

Means have been provided in each of the sections 66 for effecting precipitation of oil from the solvent either by temperature reduction or by adding a precipitating liquid, or both and/or solvent-oil solution may be withdrawn at any desired point, concentrated to precipitate oil, which with or without the solvent remaining in the liquid phase, may be returned to the column. The latter is illustrated in Figure 4.

It will, of course, be understood that a temperature gradient through the column may also be maintained by feeding the solvent at a higher temperature than the feeding temperature of the oil, or by feeding the oil at a higher temperature than the feeding temperature of the solvent. The former will cause precipitation of oil from solvent and the latter precipitation of solvent from oil.

In describing the operation with reflux it will be assumed that the lower section 66 is employed solely for the purposes of effecting solution between the oil and solvent (although precipitation with a corresponding degree of reflux and rectification in this section might take place if desired).

The up-flowing solvent when it reaches the lowermost chamber 67 will have a certain amount of oil dissolved therein. If this solvent as it passes up through the tubes 68 of the next higher section 66 is brought to a supersaturated condition either by reduction of temperature, by the addition of a third liquid, and/or by vaporization of solvent, the excess oil will be precipitated and will flow downwardly into the lowermost chamber 67 and will be fed back into the tubes 68 of the lowermost section 66, whereupon a portion will be redissolved, and carried back up for repetition of the cycle, thereby causing rectification in the manner previously described. A side stream might be taken off at the opening 84 of the lowermost chamber 67, or at the opening 83 thereof, or both as desired.

When the solvent reaches the next higher chamber 67, it is redistributed and flows up into the next higher section 66 in which further precipitation might take place causing a reflux of oil back into this chamber 67 and into the tubes 68 below. One or more side streams might be taken off from the latter chamber 67 the same as from the previous chamber 67. This process may be repeated as many times as desired as the solvent proceeds up through the column 65 since any number of sections 66 may be employed. The solvent eventually reaches chamber 72 in which it may have a final contact with the inflowing fresh oil if desired by providing caps 94 of the order of bubble caps over the upper ends of tubes 68 of the upper section 66. The solvent flows out through opening 76.

In the above description the fresh oil came in contact with the refluxed oil and of course formed a part of the side streams taken off. If desired, the side streams may comprise solely refluxed oil. This may be accomplished, for instance, by feeding the oil in through the lowermost or next lowermost opening 84 instead of through the opening 73.

Any one or more of the side streams may be retreated in a separate side tower, for instance, the tower illustrated at 100, which may have any desired construction, for instance, that of any of the towers disclosed herein. The point of feed of the side streams may be governed by any of the considerations herein.

It should be particularly noted that the column 65 is not only particularly useful in effecting contact between a plurality of liquids but is also equally useful for effecting contact between a liquid and a vapor or a plurality of vapors. It is, therefore, suitably adapted to distillation or fractionation. In this event, ends 79 of tubes 68 may be flush with their respective plates 70 particularly if sidestreams of vapor are not desired and caps 86 may be removed. Caps 81 and 94 might or might not be employed as desired. Such an arrangement will also operate for solvent treatment purposes since ends 79 are primarily for assisting the disengagement of phases and obtaining side streams.

Many variations in constructional form may be resorted to. For instance, that portion of each tube 68 which falls between plates 69 and 70 of any section might be dispensed with, in which case the plates 69 and 70 of each section might remain in place or might be made integral. Openings 90 would be plugged. The space between plates 69 and 70 of each section 66 might remain empty or it might be partially or completely filled with any suitable packing. Any suitable means might be provided to support the packing, such as the plate 70 or a perforated plate in place of plate 70 or if plate 70 were removed the packing might rest upon the next lower plate 69. In this event, additional jackets might be provided on each section for heat exchange purposes and the third liquid might still be fed in through the tubes 77 when desired.

When the oil is lighter than the solvent, the oil may be fed in through 87 and withdrawn through opening 76. Solvent may be fed in through 73 and withdrawn at 88. Side streams of solvent may be withdrawn through the openings 84 and side streams of oil may be withdrawn through the openings 83. In this event, the upper section 66 would probably be used exclusively for solution purposes, although not necessarily.

If it is not desired to have the fresh oil flow through the refluxed oil, the fresh oil might be fed through the upper or any other pipe 83 instead of through the opening 87, and precipitation might take place further downstream of the solvent flow.

Many other variations in operation may be resorted to.

Referring now more particularly to Figure 4 in which, for the purposes of illustration, a portion of column 65 has been reproduced, at 102 is illustrated a vaporizer which is connected to the column 65 in a manner so as to reduce the concentration of solvent in the column or, in other words, to reduce the solvent power of the solvent in the direction of solvent flow.

The manner in which vaporizer 102 is illustrated as being connected to column 65 is more particularly adapted for cases in which the solvent is lighter than the oil, since the inlet to the vaporizer 102 is connected to chamber 67 adjacent its top, that is, at a point within the solvent-oil solution layer in chamber 67.

In the event that the solvent is heavier than the oil, it is merely necessary to connect the inlet to the vaporizer at a lower point in chamber 67, for instance, adjacent its bottom, for in such cases the solvent-oil solution layer will be on the bottom.

After the solvent-oil solution has been concentrated in vaporizer 102 either with or without precipitation of dissolved oil, the liquid or liquids may be returned to the chamber 67, or, after separation, either liquid may be so returned as desired.

As illustrated, both the saturated solvent-oil solution and the precipitate are so returned. In this case the precipitate will be refluxed down through the column and the saturated solvent-oil solution will continue on up through the column.

A condenser 103 is illustrated as being associated with the vaporizer 102 for condensing the solvent vapors, and if desired the condensed solvent may be recycled by causing it to enter the column at the same point as the fresh solvent, or at any point above or below the solvent feed point.

Any other means may be provided for reducing the concentration of the solvent as it flows through the column.

From the foregoing it will be seen that the precipitation of dissolved oil from the solvent for reflux purposes need not necessarily take place within the column itself. This also applies when precipitation of dissolved oil for reflux purposes is effected by a reduction in temperature of the solvent-oil solution, and/or by the addition of a precipitant to the solvent-oil solution. For instance, the vaporizer 102 might be substituted by any suitable receptacle in which the solvent-oil solution might be cooled and/or precipitant added as desired, or such a receptacle might be connected in series with the vaporizer, for instance, on the downstream side in which case any one or more of the foregoing precipitation methods might be used.

While the arrangement shown in Figure 4 is illustrated at a point intermediate the length of column 65, it is to be understood that it may be placed at any desired point including the top or bottom (depending on the relative density of the solvent) of the column and that it may be connected to the column in any desired manner for the purposes herein set forth.

It is also to be understood that any number of such precipitation means may be employed along the column.

While in the solvent extraction and/or fractionation processes herein described the solvent and the materials to be treated have been more particularly referred to as being in the liquid phase, it is to be understood that one or more of such substances might be wholly or partially in the vapor or solid phase without departing from the spirit of the invention.

It is also to be understood that the invention may be adapted to many other types of operation, for instance, to one in which a counterflow of solvents is obtained with the introduction of oil at an intermediate point or with the introduction of different solvents along the line of oil flow or along the line of solvent flow. Reference is made to copending application Serial No. 699,050 filed November 21, 1933, which has matured into issued Patent 2,037,319, April 14, 1936.

The solvents may comprise a single or a plurality of compounds. When a plurality of compounds are employed, they may be miscible or partially miscible. A plurality of non-miscible solvents might also be employed.

While the invention has been particularly described in connection with the treatment of mineral oils, it may also be applied to the treatment of materials in general, whether or not the more valuable, the less valuable, or an equally valuable material is separated from the material under treatment.

The term solvent in its broader phases includes any compound or compounds, whether in the vapor, liquid and/or solid phase, and regardless of its influence upon the material under treatment.

The relative densities of solvents and/or mineral oils may be obtained upon reference to any standard handbook or by actual measurement.

While a countercurrent flow of the liquids through the column has been particularly referred to, a certain effect may be obtained even though the liquids pass through the column in the same direction.

Particular forms of apparatus have been described for the purposes of illustration. It is to be strictly understood that wide departures may be made from the forms shown in the drawings, such as by changes, omissions, additions, substitutions, and/or modifications, without departing from the spirit of the invention. The claims, therefore, are intended to be limited only as required by the prior art.

We claim

1. In a process for treating a mineral oil with a solvent, the steps of continuously flowing said oil and solvent counter-currently through a contacting column, engaging the counter-currently flowing oil and solvent phases in a plurality of phase contacting paths of relatively small cross-sectional area, and disengaging the oil and solvent phases to cause a layer formation thereof intermediate the ends of said column and between disconnected portions of said paths.

2. In a process for contacting liquid phases such as in treating a mineral oil with a solvent, the steps of continuously flowing said phases counter-currently through a contacting column, engaging the counter-currently flowing phases in a plurality of phase contacting paths of relatively small cross sectional area, and disengaging the phases to cause at least one layer formation thereof intermediate the ends of said column and between disconnected portions of said paths.

3. In a process for treating a mineral oil with a solvent, the steps of continuously flowing said oil and solvent counter-currently through a contacting column, engaging the counter-currently flowing oil and solvent phases in a plurality of phase contacting paths of relatively small cross sectional area, and disengaging the oil and solvent phases to cause layer formations thereof at a plurality of spaced points intermediate the ends of said column and between disconnected portions of said paths.

4. In a process for treating a mineral oil with a solvent, the steps of continuously flowing said oil and solvent counter-currently through a contacting column, engaging the counter-currently flowing oil and solvent phases in a plurality of spaced sets of contacting paths of relatively small cross sectional area, feeding the solvent and oil phases into all paths of any one set at substantially the same ratio one to the other, and disengaging the oil and solvent phases between two adjacent sets of paths to cause a layer formation of said phases.

5. In a process for treating a mineral oil with a solvent, the steps of continuously flowing said oil and solvent counter-currently through a contacting column, causing the oil and solvent phases to assume layer formations at a plurality of spaced points intermediate the ends of said column, and removing a part of said oil phase through at least one side stream, and separately subjecting said side stream to solvent treatment for stripping purposes.

6. In a process for the treatment of a mineral oil with a solvent by counter-currently flowing said oil and solvent through a column and wherein a part of the dissolved oil is precipitated and caused to reflux through said column, the steps of precipitating oil from said solvent in a plurality of phase contacting paths of relatively small cross sectional area, causing the precipitate phase in each path to flow counter-currently to the solvent phase in said path, and causing the solvent and precipitate phases to form at least one layer formation intermediate the ends of the column.

7. In a process for the treatment of a mineral oil with a solvent by counter-currently flowing said oil and solvent through a column and wherein a part of the dissolved oil is precipitated and caused to reflux through said column, the steps of precipitating oil from said solvent in a plurality of phase contacting paths of relatively small cross sectional area, causing the precipitate phase in each path to flow counter-currently to the solvent phase in said path, controlling the precipitation in each path so that the ratio of precipitate phase to solvent phase in said paths will be substantially the same, and causing the solvent and precipitate phases to form at least one layer formation intermediate the ends of the column.

8. In combination, a column, means in said column for causing liquids to flow counter-currently through said column by virtue of a difference in density such as in the treatment of mineral oils, means in said column for engaging the liquid phases in a plurality of sets of phase contacting paths of relatively small cross sectional area, and means for disengaging said phases intermediate said sets, and for causing at least one disengaged phase to assume a layer formation.

9. In a process for treating a mineral oil with a solvent, the steps of flowing said oil and solvent countercurrently and serially through a plurality of spaced sets of phase contacting paths of relatively small cross sectional area, and causing layer formations at opposite ends of each set of phase contacting paths.

10. In a process for treating a mineral oil with a solvent, the steps of flowing said oil and solvent countercurrently and serially through a plurality of spaced sets of phase contacting paths of relatively small cross sectional area, and precipitating oil from solution in said solvent in at least one set of phase contacting paths to set up reflux conditions.

11. A process for treating a mineral oil with a solvent comprising flowing said mineral oil and solvent countercurrently through a plurality of spaced sets of phase contacting paths of relatively small cross sectional area, precipitating oil from solution in said solvent in at least one set of phase contacting paths to set up reflux conditions, and causing the precipitate thus produced to form at least one layer formation intermediate said sets of phase contacting paths.

12. A process for treating a mineral oil with a solvent comprising flowing said oil and solvent countercurrently through at least one set of phase contacting paths of relatively small cross sectional area, flowing the solution of oil in solvent through at least one additional set of phase contacting paths of relatively small cross sectional area, precipitating oil from solution in said solvent in at least one of said second mentioned sets of phase contacting paths, flowing said precipitate back toward said first mentioned sets of phase contacting paths, and causing said precipitate to form at least one layer before returning to said first mentioned set of phase contacting paths.

MERRELL R. FENSKE.
WILBERT B. McCLUER.

DISCLAIMER 2,064,422.—*Merrell R. Fenske* and *Wilbert B. McCluer*, State College, Pa. PROCESS AND APPARATUS FOR TREATING MINERAL OILS. Patent dated December 15, 1936. Disclaimer filed October 20, 1938, by the assignee, *Pennsylvania Petroleum Research Corporation*.

Hereby enters this disclaimer to claims 1, 2, 3, 4, 8, and 9 of said Letters Patent.
[*Official Gazette November 15, 1938.*]